Figure 1:
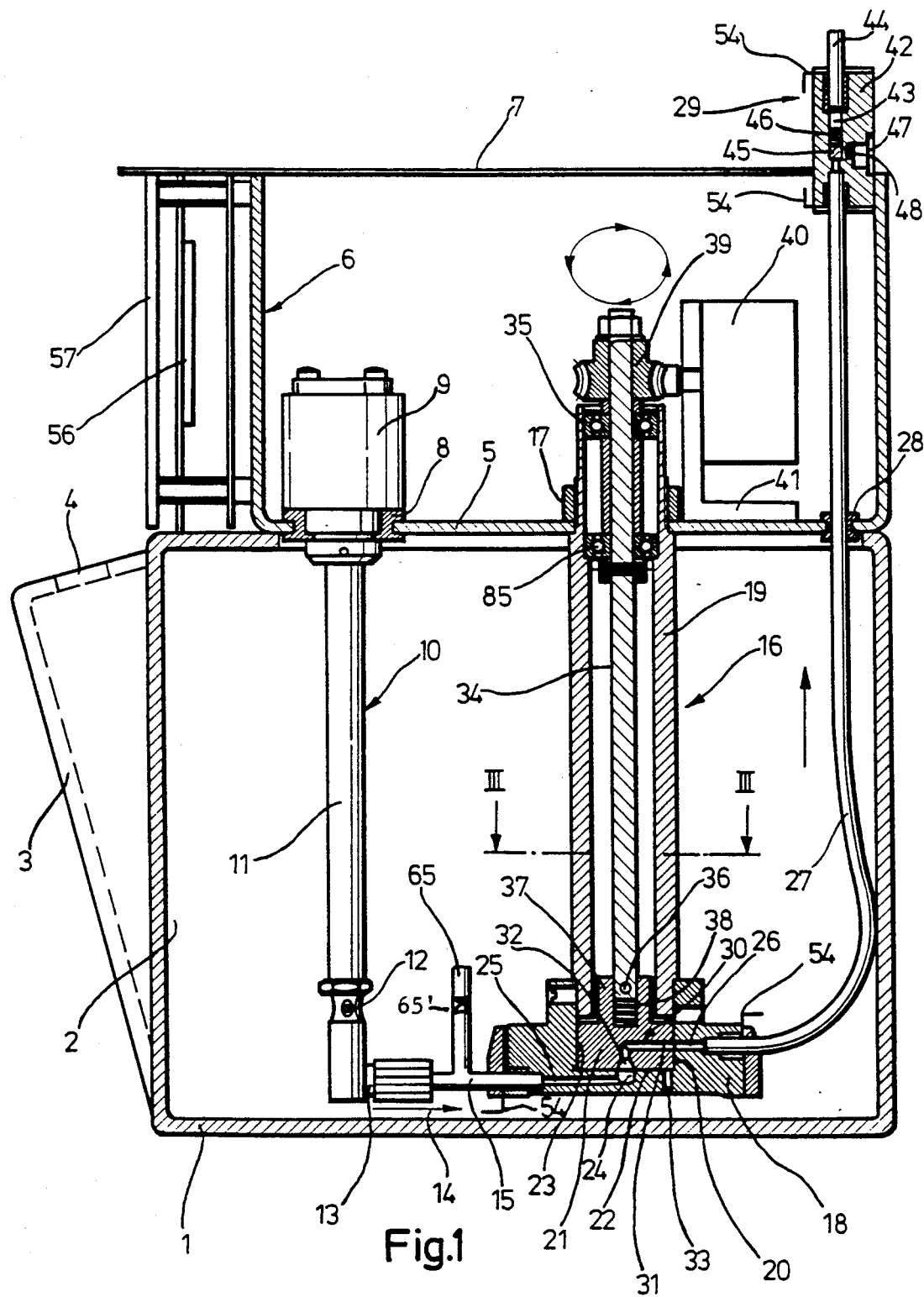

United States Patent [19]

Braun et al.

[11] Patent Number: 5,181,585
[45] Date of Patent: Jan. 26, 1993

[54] LUBRICATING DEVICE FOR SUPPLYING SEVERAL LUBRICATING POINTS, IN PARTICULAR OF A KNITTING MACHINE, WITH LUBRICANT, PREFERABLY OIL, AND METHOD

[75] Inventors: Dieter Braun, Freudenstadt; Rolf Huss, Lossburg; Alfred Lampprecht, Betzweiler, all of Fed. Rep. of Germany

[73] Assignee: Memminger-Iro GmbH, Freudenstadt, Fed. Rep. of Germany

[21] Appl. No.: 831,466

[22] Filed: Feb. 5, 1992

[30] Foreign Application Priority Data

Feb. 16, 1991 [DE] Fed. Rep. of Germany ....... 4104793

[51] Int. Cl.⁵ ............................................. F16N 27/00
[52] U.S. Cl. ..................................... 184/7.4; 184/6.4; 184/7.2; 184/6.28
[58] Field of Search ................. 184/7.4, 7.3, 7.2, 6.15, 184/6.28, 6.4; 112/43, 256; 137/625.11, 625.16

[56] References Cited

U.S. PATENT DOCUMENTS

| | | | |
|---|---|---|---|
| 1,889,068 | 11/1932 | Hoss | 184/7.2 |
| 2,834,376 | 5/1958 | Hughes | 184/7.2 |
| 3,151,718 | 10/1964 | Temple | 137/625.11 |
| 3,217,835 | 11/1965 | Settles et al. | 184/7.4 |
| 3,253,678 | 5/1966 | Osmond | 137/625.11 |
| 3,395,046 | 7/1968 | Levine et al. | 137/625.16 |
| 4,286,691 | 9/1981 | Stong | 184/6.28 |
| 4,326,604 | 4/1982 | Sotiropoulos | 137/625.11 |

FOREIGN PATENT DOCUMENTS

| | | |
|---|---|---|
| 383387 | 10/1923 | Fed. Rep. of Germany. |
| 908689 | 3/1954 | Fed. Rep. of Germany. |
| 2936374 | 3/1981 | Fed. Rep. of Germany. |
| 3624982 | 4/1988 | Fed. Rep. of Germany. |
| 1094985 | 5/1955 | France. |

Primary Examiner—Ira S. Lazarus
Assistant Examiner—Alan Cariaso
Attorney, Agent, or Firm—Frishauf, Holtz, Goodman & Woodward

[57] ABSTRACT

A lubricating device for supplying a plurality of lubricating points or positions, in particular of a knitting machine, with lubricant, preferably oil, has a lubricant distributor (16) which is connected on the inlet side to the pressure side of a piston-type lubricant pump (9-13) and which has lubricant outlets (26, 29) which are associated with the individual lubricating points and can be individually activated by the lubricant distributor. For this purpose, the lubricant distributor contains a distributor element (21, 21') which is rotated by a controlled motor (40) and is provided with a distributor channel via which a flow connection is established between the pressure side of the piston pump and the respectively selected lubricating point or position, in a program-controlled manner. The time duration of lubricant flow to the lubricating points or positions can be controlled, so that each lubricating point or position receives the required lubricant.

21 Claims, 4 Drawing Sheets

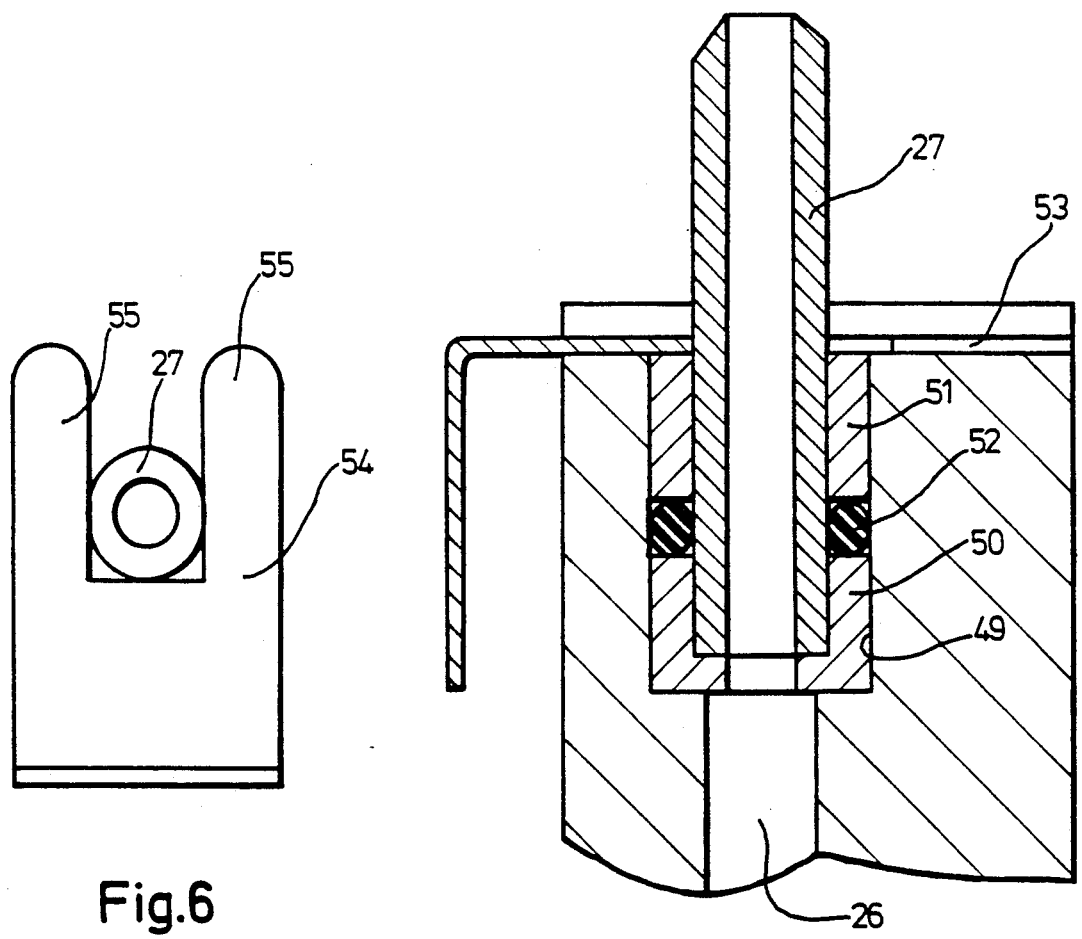
Fig.6
Fig.5
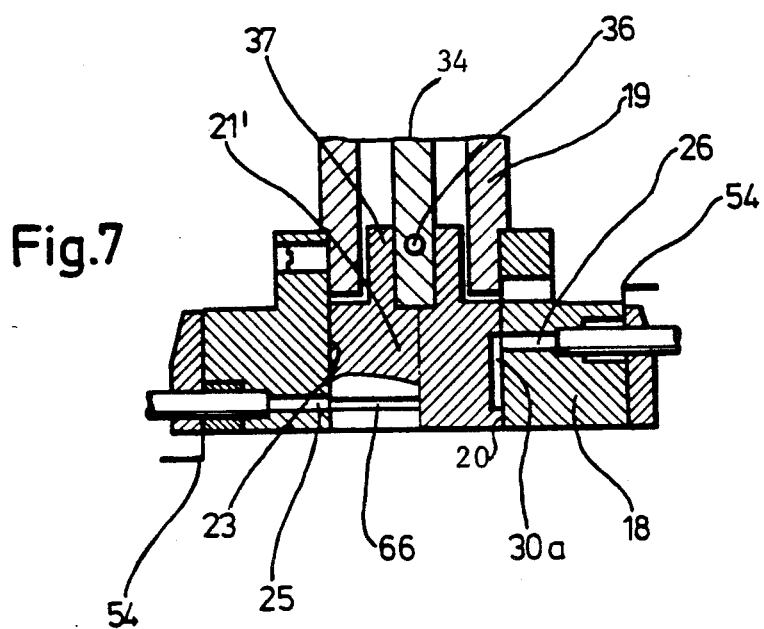
Fig.7

LUBRICATING DEVICE FOR SUPPLYING SEVERAL LUBRICATING POINTS, IN PARTICULAR OF A KNITTING MACHINE, WITH LUBRICANT, PREFERABLY OIL, AND METHOD

FIELD OF THE INVENTION

The invention relates to a lubricating system and device for supplying several lubricating points, and more particularly to a lubricant system for a knitting machine, e.g. a circular knitting machine, with lubricant, preferably oil, and a method of controlled lubrication.

BACKGROUND

It is known to provide a common lubricant pump for a number of lubricating points; the pump is electromagnetically actuatable in pulses and respectively discharges a predetermined amount of lubricant. A lubricant supply container is connected to the lubricant pump on the suction side; connecting devices for lubricant pipes which lead to the individual lubricating points can be selectively supplied with lubricant from the pressure side of the lubricant pump; an electric control device controls, in predetermined manner, supply of the lubricant to the lubricating points with respect to time.

The needle drive, including cam parts of knitting machines, requires constant lubrication. Likewise, the needle guides in the needle bed or cylinder need to be lubricated. Perfect, regular lubrication is of very great importance, particularly in modern, high-speed knitting machines. For this reason, these machines are often equipped with pressure oilers or pressure oil lubricating systems which from a central point supply pressurized oil through corresponding pipes to the individual lubricating points.

In a pressure oil lubricating device known from French Patent 1 094 985 a pulsed, electromagnetically actuated reciprocating pump is connected on the pressure side via pipes containing check valves to several lubricating points. The piston stroke of the lubricant pump can be changed in order to change the amount of lubricant conveyed per stroke. This device cannot ensure that all lubricating points will be supplied with identical amounts of lubricant. Since the lubricant pipes are connected in parallel to the pressure side of the lubricant pump, the amount of lubricant supplied to the individual lubricating points depends, among other things, also on the line flow resistance to the respective lubricating point. In another pressure oil lubricating device, in particular for knitting machines, known from German published patent application 36 24 982, an oil pump is provided in the form of an electromagnetically actuatable vibratory or oscillating piston pump. This oil pump is connected on the suction side to an oil supply container and its pressure pipe branches off into several branch pressure pipes each of which can be opened and closed by an electromagnetic valve. Each of these branch pressure pipes leads to an oil distributor chamber to which several oil supply pipes leading to the individual lubricating points are connected via check valves. The drive of the vibratory piston pump and successive opening of the electromagnetic valves can be automatically and arbitrarily activated by a control device comprising a programmable microprocessor. Since several oil supply pipes are connected to each oil distributor chamber, in this case too, it is not ensured that each lubricating point will necessarily receive the same amount of lubricant per piston stroke of the vibratory piston pump.

Uniform oil supply is ensured in an oil lubricating system, in particular for knitting machines, known from Germany Patent 29 36 374, in which each lubricating point has a piston pump of its own and an electronic circuit for controlling the respective drive associated therewith. Several piston pumps with their electronic circuits and an oil supply container can be united to form one structural unit. In high-feed knitting machines with a substantial number of lubricating points, the cost involved in a large number of individual piston pumps required fro this system is high.

THE INVENTION

It is an object to provide a lubricating device for supplying several lubricating points, in particular in a knitting machine, and especially a circular knitting machine, which, with a simple design, reliably supplies the individual lubricating points with precisely determined amounts of lubricant per lubricating cycle.

A lubricant distributor contains a movable distributor element. The distributor has a lubricant inlet which is connected to the pressure side of the single lubricant pump. Its outlet side is connected to the lubricant pipe connecting devices. The distributor element establishes, selectively and based on a position thereof, a connection between the lubricant inlet and a respectively selected lubricant outlet which is associated with a certain lubricant pipe of the connecting device. The distributor element is connected to servo motor means which is controlled by an electric control unit such that the duration of lubricant flow to any one outlet can be controlled.

A flow connection is established between the pressure side of the lubricant pump and the selected lubricating point, via the movable distributor element of the lubricant distributor, during each lubricating operation, discharging a precisely metered amount of lubricant per stroke. This ensures that each lubricating point necessarily receives precisely the amount of lubricant supplied by the lubricant pump per lubricating cycle, independently of whether the pipes leading to the individual lubricating points have different line resistances or whether changes in the temperature of the lubricant occur or other influences prevail to otherwise impair the distribution of the lubricant. Nevertheless, the device operates with only a single lubricant pump for supplying all of the lubricating points.

In a preferred embodiment, the lubricant distributor comprises a rotationally symmetrical distributor element which is mounted for rotational movement in a distributor housing containing the lubricant inlet and the lubricant outlets and contains at least one distributor channel which is permanently connected to the lubricant inlet and can be made to communicate in a predetermined sequence with the individual outlets. The servo means herein comprises a drive source which imparts a rotational movement to the distributor element.

Simple structural relations are obtained when the distributor element is formed as a distributor disc or plug which is sealingly inserted in a corresponding rotationally symmetrical bearing point of the distributor housing and contains at least one distributor channel which opens at the center of an end face and at the circumference of the distributor plug. Channels are provided in the distributor housing opening at the bottom of the bearing point and at its circumferential wall and leading to its lubricant inlet and to the lubricant outlets, respectively. The lubricant distributor may contain a pressure relief valve arranged in the region of the distributor disc and leading to its bearing gap. The pressure relief valve simultaneously serves to monitor operation. It is also advantageous for the distributor disc to be pressed axially by spring force against the bottom of the bearing point.

The lubricant distributor is expediently arranged in the lubricant supply container in which it is at least partly submerged in the amount of lubricant contained in it and so any unavoidably occurring leakages do not require special additional measures. A simple structural solution is achieved by the lubricant supply container containing a chamber designed for receiving the quantity of lubricant. This chamber is closed to the outside and the lubricant pump and/or the lubricant distributor are placed in it. The drive means of the lubricant pump and/or the drive source of the lubricant distributor can then be placed on the outside of a wall of the chamber so they do not come into contact with the lubricant itself. The lubricating device may also comprise connection means for an additional liquid source which opens at the lubricant pump and/or in the region of the inlet of the lubricant distributor and by means of which, for example, for flushing purposes, a quantity of liquid can be made to flow under pressure through at least the lubricant distributor and the connecting devices for the lubricant pipes. In practice, it is, for example, in this way possible to connect a gear pump which floods the entire device or the lubricating points with oil independently of the actual lubricant pump or supplies oil to the positions to be lubricated. Each of the lubricant pipe devices may also have associated with it a lubricant flow monitor of its own to enable all of the devices to be checked for proper operation at any time. This checking is facilitated by the lubricant device having an optical display device for the operating state of the individual lubricant pipes which is activated by the flow monitor.

The rotationally movable distributor element explained hereinabove can receive its rotational motion from a drive source of any chosen design suitable for this purpose. It only need be capable of precisely aligning the distributor channel of the distributor element with the respectively selected lubricant outlet of the distributor housing. It is synchronized with the drive device of the lubricant pump, which is usually in the form of a piston pump, by the electronic control device in such a way that the amount of lubricant conveyed by the pump is delivered to the lubricant pipe that is respectively selected and activated in accordance with the program after the pertinent pipe connection between the pressure side of the pump and the associated lubricant outlet of the distributor housing has been established via the distributor channel of the distributor element. Relatively simple, precise activation of the distributor element by the programmable control unit is achieved by the drive source of the distributor element being designed to implement its rotational movement in predetermined angle increments, for example, as a stepping motor.

Finally, to facilitate the placement of the lubricating device on the knitting machine itself, its connecting devices can each comprise a plug connection for a lubricant pipe which is provided with a safety device for the lubricant pipe which is usually in the form of a hose. It is advantageous for this safety device to comprise a forked part which is insertable in holding means and partly embraces the hose-shaped lubricant pipe.

DRAWINGS

Figure 2:
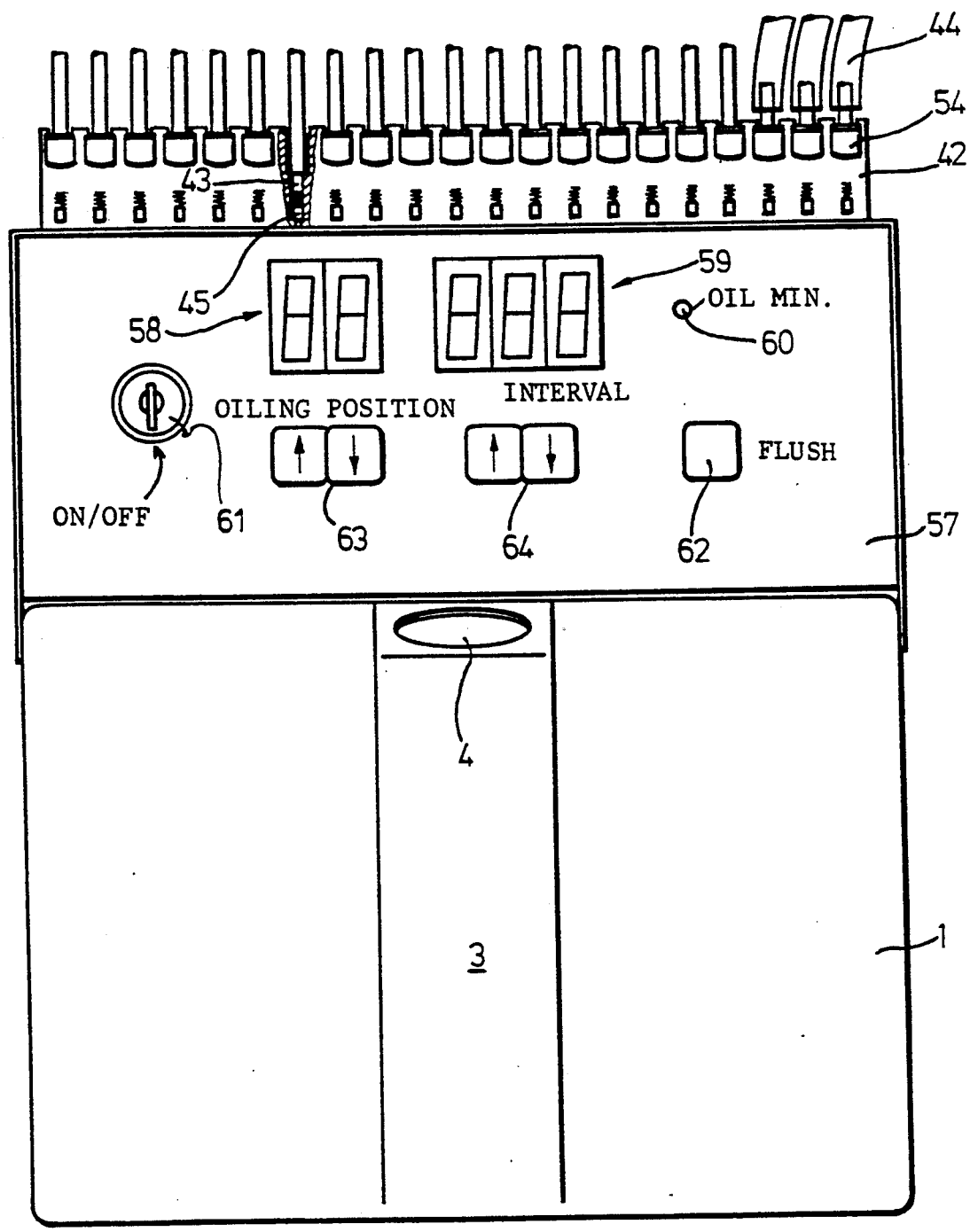
Figure 3:
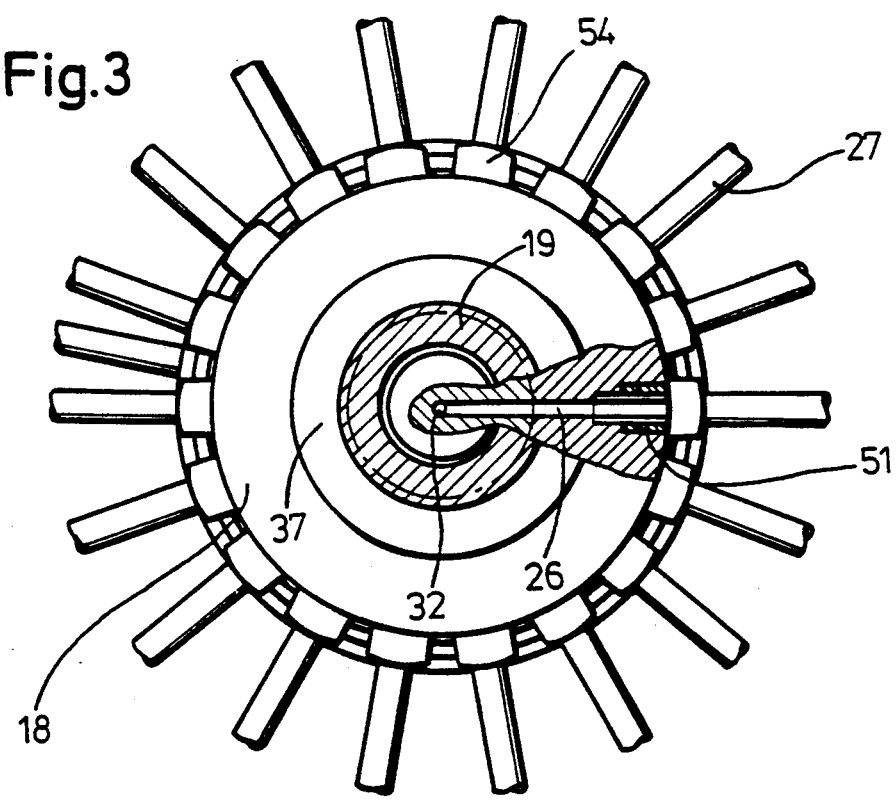
Figure 4:
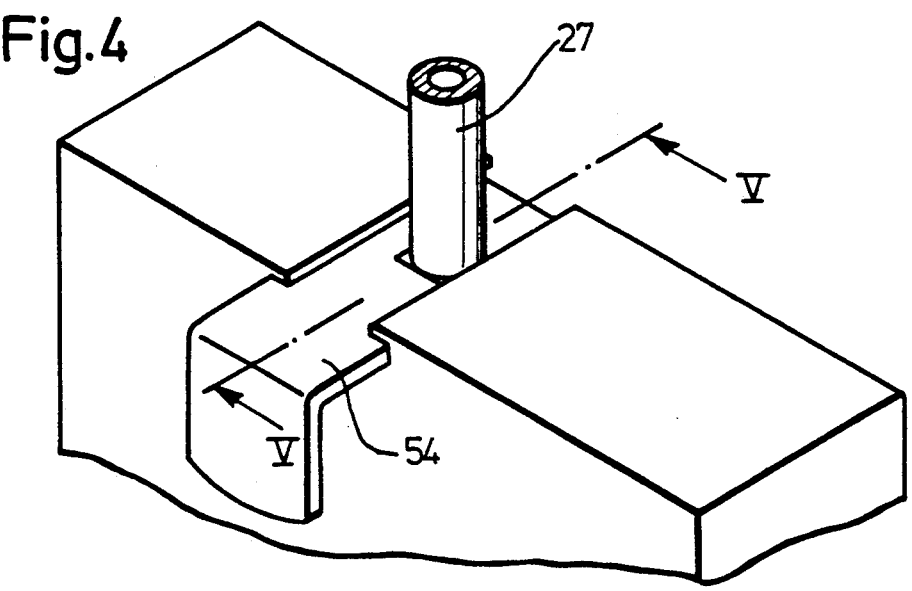

An embodiment of the subject matter of the invention is illustrated in the appended drawings which show:

FIG. 1 a schematic side view of a lubricating device according to the invention in the form of a pressure oiler for a knitting machine in axial section;

FIG. 2 a plan view of the operating side of the pressure oiler according to FIG. 1;

FIG. 3 a plan view of the lubricant distributor of the pressure oiler according to FIG. 1, taken along line III—III of FIG. 1, partly broken open and on a different scale;

FIG. 4 a schematic, perspective illustration of a lubricant hose plug connection of the pressure oiler according to FIG. 1 or 2;

FIG. 5 a side view of the assembly according to FIG. 4, taken along line V—V of FIG. 4, on a different scale;

FIG. 6 a plan view of the safety slide of the assembly according to FIG. 4; and

FIG. 7 a partial, sectional illustration of a modified embodiment of the lubricant distributor according to FIG. 3.

The pressure oil lubricating device illustrated in FIGS. 1 and 2, referred to hereinbelow as pressure oiler, comprises a housing 1 made of a plastic material and approximately rectangular in cross-section. The housing 1 forms a lubricant supply container and for this purpose encloses a chamber 2 designed to receive an oil supply. An oil filling hole 4 which is arranged in a filling funnel 3 formed at the side and is closable by a plug, opens into the chamber 2. The chamber 2 is closed upwards by an intermediate bottom 5 sealingly placed on it. The intermediate bottom 5 is the bottom wall of a tub-like partial housing 6 which is closed at the top by a removable cover wall 7.

The housing 9 of the electromagnetic drive of a piston pump designated 10 is inserted in a corresponding opening in the intermediate bottom 5 and sealed by a sealing sleeve 8. The piston pump 10 serves as lubricant pump and conveys a precisely metered amount of oil per piston stroke. The piston pump 10 comprises a pump pipe 11 with a suction opening 12 at its end. A pressure connection piece 13 through which oil aspirated from the chamber 2 is conveyed in surges or pulses in the conveying direction indicated by an arrow 14 is connected to the pipe 11.

In accordance with a feature of the invention, a lubricant distributor 16 is connected to the pressure connection piece 13 of the piston pump 10 via pipe 15. The lubricant distributor 16 is inserted in a corresponding opening in the intermediate bottom 5 and held on the intermediate bottom 5 by a screwed-on threaded ring 17.

The lubricant distributor 16 comprises a distributor housing 18 of essentially cylindrical design which is illustrated in detail in FIG. 3. The distributor housing 18 is attached by means of a coaxial spacer pipe 19 in the manner described hereinabove to the intermediate bottom 5. A coaxial cylindrical recess 20 forming the bearing point for a disc-shaped, cylindrical distributor element 21 mounted for rotational movement in the distributor housing 18 is arranged in the distributor housing 18. The bore 20 is provided with a flat bottom wall 22 which is arranged at a right angle to the cylindrical circumferential wall 23 and at the center of which an oil supply bore 24 forming an oil inlet opens. The oil supply bore 24 is connected to the pipe 15 via an oil feed channel 25 formed in the distributor housing 18.

Radial oil channels 26 open at identical angular spacings in the cylindrical circumferential wall 23 of the bore 20. Each of the oil channels 26 forms a lubricant outlet and is connected to a connecting hose 27. Sealed by an elastic sealing ring 28, the connecting hose 27 leads through a corresponding bore in the intermediate wall 5 to a lubricant pipe connecting device 29. The distributor element 21 contains a substantially L-shaped distributor channel 30, the horizontal leg 31 of which opens in the cylindrical circumferential surface at the level of the radial channels 26, and the vertical leg of which extends coaxially and is oriented towards the oil supplying bore 24. With its cylindrical circumferential surface, the distributor element 21 is fitted with an exact, precise fit into the bore 20 of the distributor housing 18, with the mating of the cylindrical wall of the bore 20 and the cylindrical circumferential surface of the distributor element 21 being selected such that the distributor element 21 remains freely rotatable about the vertical axis, while, on the other hand, under normal pressure conditions the cylindrical bearing gap allows no oil to exit. There is also provided in the distributor housing an excess pressure bore 33 which opens in the region of the bottom 22 of the bore 20. This excess pressure bore 33 forms a kind of pressure relief valve and enables general operation checking, as will be explained in detail hereinbelow.

Rotationally fixedly connected to the rotationally movable distributor element 21 is a coaxial shaft 34 which extends through the spacer pipe 19 and is rotatably, but axially immovably mounted in it by means of two ball bearings 35. A follower pin 36 which engages an axial follower slot open at the rim in an associated bushing 37 of the distributor element 21 serves to connect the shaft 34 with the distributor element 21. A compression spring 38 which presses the distributor element 21 with corresponding pretension against the bottom wall 22 of the bore 20 of the stationary distributor housing 18 is arranged between the distributor element 21 and the shaft 34.

A pinion 39 of a toothed gearing is positioned on the drive side of the shaft 34. The toothed gearing is connected to a servomotor 40 which is attached to the intermediate bottom 5 by means of an angled part 41 and constitutes the drive source for the lubricant distributor 16. The servomotor 40 is, for example, an electric stepping motor.

The lubricant pipe connecting device 29 comprises on the rear wall of the partial housing 6 a strip-shaped connection housing 42 protruding beyond the top of the rear wall of the partial housing 6 (cf. FIGS. 1 and 2). The connection housing 42 contains for each lubricating point to be supplied a through-channel 43 with a connection pipe 27 sealingly connected to one end and a lubricant pipe 44 leading away to the respective lubricating point sealingly connected to the other end. An inspection member or element 45 with a compression spring 46 associated with one side thereof is arranged in each through-channel 43. The movement of the member 45 can be observed from outside through a viewing window 47 providing a view of the member 45. Also arranged in the region of each viewing window 47 is an electric position indicator 48, for example, in the form of a Hall generator which together with the member 45 forms an electronic lubricant flow monitor for the respective lubricant pipe 44 and hence enables electronic checking of operation. In the event of clogged or impaired oil flow, the oil pulse reporting signal generated by the indicator 48 is interrupted, which causes the disturbance to be optically indicated on the operating side of the housing 1 and a stop motion OFF signal for the knitting machine to be simultaneously generated.

The connecting hoses 27 and the lubricant pipes 44 which are likewise in the form of hoses are connected in a sealed-off manner by plug connections, i.e., screw-free, to the distributor housing 18 and the connection housing 42, respectively. The design of these plug connections is shown, in particular, in FIGS. 4 to 6:

Each plug connection comprises a connecting bush 50 inserted in a corresponding cylindrical bore 49 of the distributor housing 18 and the connection housing 42, respectively. Together with a cylindrical sleeve 51 likewise inserted in a sealed-off manner in the bore 49, the connecting bush 50 delimits a ring gap in which an elastic O-ring 52 is inserted. The O-ring 52 seals off the inserted end of an inserted hose, for example, connecting hose 27, from the wall of the bore 49 in the manner shown in FIG. 5.

Two parallel transverse grooves 53 are formed on either side of each bore 49 in the distributor housing 18 and the connection housing 42, respectively. These transverse grooves 53 together form a longitudinal guide for a safety slide in the form a metallic, fork-shaped, angled part 54 which in the inserted state embraces the inserted plastic hose 27 with its two legs 55 on either side thereof. The plastic hose 27 is slightly compressed between the legs 55 and is thereby held securely at its outer circumference.

The electromagnetic drive device 9 of the piston pump 10 and the servomotor 40 of the lubricant distributor 16 are activated by an electronic programmable control device, the printed circuit boards of which are, for example, indicated at 56 (FIG. 1). A display device 58 for identifying the respective oiling point or position, a display device 59 for indicating the duration of the respective lubricating supply, an minimum oil level display 60, a main ON/OFF switch 61 and an optical display 62 for flushing the lubricating points ("flush") are arranged on a front panel 57 of the housing 1.

In accordance with a feature of the invention, a respectively indicated oiling point or position can be selected by two pushbuttons 63. Two pushbuttons 64 serve to adjust the time duration of the respective pulsed lubricating supply. The interval time is indicated on display 59.

Operation

The pressure oil lubricating device described hereinabove operates as follows:

After a time interval which is previously set and indicated by the display device 59 is reached for a selected oiling point indicated on the display device 58, the control device 56 activates the servomotor 40 such that it directs the distributor element 21 with its distributor channel 30 towards the radial channel 26 of the distributor housing 18 that is associated with the respective oiling point and positions the distributor element 21 in the angular position reached. Hence a direct pipe connection is established between the pressure side of the piston pump 10 and the selected oiling point. The control device 56 now brings about corresponding actuation of the piston pump 10 by means of which a precisely metered amount of oil uninfluenced by temperature and viscosity of the oil is conveyed via the pipe connected to the selected oiling point.

After completion of the lubricating operation at this oiling point, the servomotor 40 turns the distributor element 21 further in a program-controlled manner into an angular position in which a pipe connection is again established in the manner described hereinabove between the pressure side of the piston pump 10 and the new oiling point and the piston pump 10 is then actuated again. This procedure is repeated until all of the oiling points are provided with the predetermined amount of oil.

The radial channels 26 in the distributor housing 18 that are associated with the individual oiling points do not have to be selected in a sequence corresponding to their spatial arrangement on the circumference of the bore 20. Selection of the respective oiling point to be supplied is carried out according to the program in conformity with the respective operating conditions and requirements. The time intervals for the supplying of the lubricating oil to each oiling point can be selected individually and set by the pushbuttons 64. The respectively set interval is indicated by the display device 59.

In principle, it is also possible for the amount of oil supplied to the oiling point to be individually selected in accordance with the respective requirements. After the connection has been established in the manner described hereinabove between the pressure side of the piston pump 10 and the respective oiling point, the respectively required amount of oil can be conveyed by appropriate selection of the duration of actuation or operation of the piston pump 10, in dependence upon the respective programming of the control device 56.

Instead of the stepped turning of the distributor element 21 for interval-wise selection of individual oiling points, the servomotor 40 can also be controlled in such a way that it imparts to the distributor element 21 a constant rotational movement (for example, ⅓ revolution per second). The electromagnetic drive device 9 of the piston pump 10 is synchronized with the servomotor 40 via the control device 56 so the piston pump 10 always conveys the respectively predetermined amount of oil when the distributor channel 30 at least partly covers a radial channel 26 in the distributor housing 18. With, for example, 18 radial channels 26 and hence 18 oiling points, there is a pumping frequency of 6 strokes per second.

The lubricant distributor 16 is arranged with its distributor housing 18 at the lowest possible point in the chamber 2 containing the oil supply so it is submerged in the oil supply. For this reason, any slight leaks which might occur require no special measures. If an oil pressure exceeding the rated operating pressure should occur in the lubricant distributor 16 owing, for example, to the pipe connection to the respectively selected oiling point being clogged, the distributor element 21 is raised off the bottom 22 of the bore 20 of the distributor housing 18 against the action of the compression spring 26. The otherwise closed excess pressure bore 33 is thereby released and so the oil conveyed by the piston pump 10 can flow off safely along this path.

Finally, the pipe 15 connecting the pressure side of the piston pump 10 with the lubricant distributor 16 is provided with a pipe branch-off 65 having a normally closed vale 65' therein for connection when valve 65' is opened, e.g. electrically, of an additional pump, for example, a gear pump, not illustrated herein. On this path, the lubricant distributor 16 and the connected pipes, including the lubricant pipe connecting device 29, can, if required, be flushed, it also being possible to flush the oiling points with oil (flush operation).

The modified embodiment of the lubricant distributor 16 shown in the partial illustration in FIG. 7 corresponds substantially to the embodiment described hereinabove with reference to FIGS. 3 and 4. Identical parts, therefore, bear identical reference numerals and are not explained again.

Differing from the embodiment according to FIGS. 3 and 4, the disc-shaped, cylindrical distributor element 21' of FIG. 7 does not comprise an essentially L-shaped distributor channel in alignment with an oil supply bore arranged at the center of the distributor housing 18. Instead, the distributor element 21' is disc or plug-shaped and has a ring-shaped oil supply channel 66 which opens towards its cylindrical circumferential surface and is closed by the cylindrical circumferential wall 23 of the distributor housing 18. The oil feed channel 25 opens into the oil supply channel 66. Arranged at one location on the circumference of the distributor element 21 is a short, groove-shaped axially parallel distributor channel 30a which has a width which corresponds approximately to the diameter of a radial oil channel 26. This distributor channel extends from the oil supply channel 66 to the level of the top of the openings of the radial oil channels 26.

In this case, the bore 20 receiving the distributor element 21' is in the form of a cylindrical through-bore in the distributor housing 18; the flat bottom wall 22 of FIG. 3 is dispensed with. Accordingly, the shaft 34 is rigidly connected to the distributor element 21'. The compression spring 38 of FIG. 3 is omitted and the follower pin 36 extends through a corresponding transverse bore in the bush 37 of the distributor element 21'.

The distinctive feature of this embodiment is simplified manufacture because a simple through-bore 20 with an exact fit suffices.

The lubricating device was described hereinabove as pressure oiler for knitting machines. In principle, it can naturally also be used for supplying lubricant in other machines and devices in which there is a question of supplying from a central point a plurality of lubricating points with exactly metered amounts of lubricant at predetermined time intervals. It is also not absolutely necessary for the lubricant to be oil; other lubricant preparations can also be supplied by this lubricating device. The lubricant pipes 44 themselves lead to the spray nozzles known per se at the individual oiling points; they can, however, just as well serve to supply other lubricating or oiling devices which, for their part, contain means for applying the supplied lubricants to the parts to be lubricated.

We claim:

1. Lubricating device for supplying with lubricant, optionally oil, a plurality of lubricating points or positions, especially for use in a knitting machine, having
   a lubricant supply container (1);
   a single common electromagnetically actuable pulse lubricating pump (9, 10, 11) for said plurality of lubricating points or positions, said pump having a suction side connected to said supply container, and discharging a predetermined amount of lubricant at a predetermined pressure for each operating pulse;

a plurality of lubricating pipe connecting devices (27, 29) for lubricating pipes which lead to the individual lubricating points or positions;

a lubricant distributor (16) including
  a lubricating supply means (24) connected to the pressure side of said single lubricating pump;
  a plurality of outlet means (26), each of said outlet means leading to an individual lubricating pipe connection device (27, 29), and
  a movable distributor element (21) for establishing a fluid connection between the lubricant supply means (24) and the selected outlet (26);

controllable positioning means (40) coupled to said distributor element (21) to position the distributor element to establish a connection between the lubricant supply means (24) and the respectively selected lubricant outlet means (26) associated with a respective lubricant pipe connecting device, and hence a lubricating point or position; and a settable electric control device (56, 57) connected to and controlling said controllable positioning means for controlling
  a) lubricant supply to a selected lubricant point or position; and
  b) the time duration of flow of said lubricant supply to the selected lubricant point or position, and, sequentially, controlling lubricant supply and time duration of lubricant flow to selected lubricant points or positions in a sequence determined by said control device (56, 57) as determined by the selected setting of said control device.

2. The lubricating device as claimed in claim 1, wherein the lubricant distributor (16) comprises a rotation-symmetrical distributor element (21), mounted for rotational or movement in a distributor housing (18),
  said housing comprising a lubricant inlet hydraulically coupled to the lubricant supply means (24), the lubricant outlet means (26) including at least one distributor channel (36) which is permanently connected to the lubricant supply means (24) and connectable with the individual outlet means in a sequence determined by the selected setting of said control device; and
  wherein the controllable positioning means (40) comprises a servo motor means connected to and controlled by said control device (56, 57) for imparting rotational movement to the distributor element (21).

3. The lubricating device as claimed in claim 1, wherein the distributor (16) comprises a distributor housing (18) and the distributor element comprises a distributor plug (21) which is inserted in a sealed manner, rotation-symmetrically in a bearing (20) of the distributor housing;
  wherein the housing is formed with a plurality of distributor channels (26) forming said outlet means, and the distributor plug (21) is formed with at least one distributor channel (30) open at an end face on the circumference of said plug to establish communication with a channel (26) in the distributor housing in dependence on the rotational position of said plug;
  and hydraulic connection means (32) hydraulically connecting the distributor channel (30) to the lubricant supply means (24).

4. Lubricating device as claimed in claim 3, characterized in that the lubricant distributor (16) comprises a pressure relief valve (33) which is arranged in the region of the distributor plug (21) and leads to its bearing gap.

5. Lubricating device as claimed in claim 4, characterized in that the distributor plug (21) is pressed axially with spring force against the bottom (22) of the bearing point (20), and an excess pressure bore (33) of the pressure relief valve is formed in the housing (18) which bore is normally closed and extends downwards from the bottom of the housing.

6. Lubricating device as claimed in claim 1, characterized in that the lubricant distributor (16) is arranged in the lubricant supply container (1).

7. Lubricating device as claimed in claim 6, characterized in that the lubricant distributor (16) is arranged so as to be at least partly submerged in the quantity of lubricant contained in the supply container (1).

8. Lubricating device as claimed in claim 1, characterized in that the lubricant supply container (1) defines a chamber (2) designed for receiving a quantity of lubricant which is closed in the outward direction and at least one of: the lubricant pump (10); the lubricant distributor (16) is located therein.

9. Lubricating device as defined in claim 8, characterized in that the drive means (9) of the lubricant pump (10) or the controllable positioning means (40) of the lubricant distributor (16), respectively, are placed on the outside of a wall (5) of the chamber (2).

10. Lubricating device as claimed in claim 1, characterized by closable connection means (65) for an additional source of liquid which opens to an inlet (25) of the lubricant distributor (16) hydraulically coupled to said lubricant supply means (24) for conducting a quantity of liquid under pressure through at least the lubricant distributor (16) and the connecting devices (29) for the lubricating pipes (44).

11. Lubricating device as claimed in claim 1, characterized in that each of the lubricant pipe connecting devices (27, 29) has associated with it a lubricant flow monitor (45, 46, 48).

12. Lubricating device as claimed in claim 11, characterized by an optically inspectable display device (47) for displaying the operating state of the lubricant pipes (44) and which is coupled to the flow monitor (45, 46, 48).

13. Lubricating device as claimed in claim 1, characterized in that the connecting devices each comprise a plug connection for a lubricant pipe (15, 27, 44), and a lubricating pipe retention element (54).

14. Lubricating device as claimed in claim 13, characterized in that the retention element comprises a forked part (54) which partly embraces the associated lubricant pipe.

15. Lubricating device as claimed in claim 1, wherein said controllable positioning means provides continuous rotary movement to the distributor element (21) of the lubricant distributor (16) at least for a predetermined period of time; and
  wherein the pump (10) includes a pump drive device (9), said pump drive device being synchronized with the rotary movement of the distributor element (21) of the lubricant distributor so that the lubricant pump will provide a quantity of lubricant when a pipe connection is established between the pump and a selected outlet means (26) and hence a lubricating point or position.

16. Lubricating device as claimed in claim 1, wherein the controllable positioning means comprises a drive motor (40) coupled to the distributor element (21) of the lubricator, said drive motor moving the distributor element in predetermined angular increments under control of said electric control device (56, 57).

17. Lubricating device as claimed in claim 1, wherein said electric control device (56, 57) includes means (64) for setting the time duration during which said controlled positioning means (40) position the distributor element to establish a connection between the lubricant supply means (24) and a selected lubricant outlet means (26).

18. The lubricating device as claimed in claim 1, wherein the electric control device (56, 57) is coupled to said pulse lubricating pump (9, 10, 11) to receive data representative of the operating pulses of the pump, and controls the controlled positioning means (40) which has established fluid communication with a selected lubricant outlet means (26) for a time duration of said established connection of a selected number of said operating pulses.

19. A method of lubricating a plurality of lubricating points or positions, especially for use in a knitting machine, by providing a lubricant, optionally oil, to said positions, said method comprising supplying lubricant from a pressure source (9, 10, 11) under predetermined pressure to a lubricant distributor (16) having a plurality of outlet means (26), each connected with an associated lubricating point or position;

establishing a hydraulic connection between said pressure source and a selected one of said outlet means and hence to a selected one of said lubricating points or positions, selected independently of the operation of said pressure source;

controlling the time duration which the lubricant, at said predetermined pressure, is connected from the pressure source to the selected lubricating point or position through said outlet means and hence to the selected point or position; and reestablishing a hydraulic connection between said pressure source and another selected one of said outlet means of said distributor independently of the relative position of the newly selected outlet means with respect to a previously selected outlet means.

20. The method as claimed in claim 19, wherein the control of the time of said selected connection is a function of at least one of: length of connecting line between the pressure source and the lubricating point or position; flow conditions in said connecting line.

21. The method as claimed in claim 19, including the step of monitoring flow of lubricant for said predetermined time interval to the respectively selected lubricating point or position.

* * * * *